(12) United States Patent
Yamamoto (10) Patent No.: US 10,303,043 B2
(45) Date of Patent: May 28, 2019

(54) IMAGE PROJECTION APPARATUS (71) Applicant: CANON KABUSHIKI KAISHA, Tokyo (JP)

(72) Inventor: Hiroshi Yamamoto, Ageo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/055,668

(22) Filed: Aug. 6, 2018

(65) Prior Publication Data

US 2019/0049824 A1 Feb. 14, 2019

(30) Foreign Application Priority Data

Aug. 9, 2017 (JP) ................................. 2017-154518

(51) Int. Cl.
*G03B 21/14* (2006.01)
*H04N 9/31* (2006.01)
*G03B 21/00* (2006.01)
*G03B 21/28* (2006.01)
*G02B 27/10* (2006.01)
*G02B 27/09* (2006.01)
*G02B 5/30* (2006.01)

(52) U.S. Cl.
CPC ......... *G03B 21/005* (2013.01); *G02B 5/3025* (2013.01); *G02B 27/0955* (2013.01); *G02B 27/10* (2013.01); *G03B 21/28* (2013.01); *H04N 9/3102* (2013.01)

(58) Field of Classification Search
CPC .... G03B 21/14; G03B 21/005; G03B 21/006; G03B 21/008; H04N 9/31; H04N 9/3102; G09G 3/005
See application file for complete search history.

(56) References Cited

U.S. PATENT DOCUMENTS

| | | | |
|---|---|---|---|
| 7,267,442 B2 * | 9/2007 | Childers | H04N 9/3111 348/792 |
| 8,994,764 B2 | 3/2015 | Watanabe | |
| 9,354,494 B2 * | 5/2016 | Mashitani | G03B 21/142 |
| 2006/0007057 A1 * | 1/2006 | Choi | G02B 26/0875 345/9 |
| 2016/0306269 A1 * | 10/2016 | Gyoten | G03B 21/142 |

FOREIGN PATENT DOCUMENTS

| | | |
|---|---|---|
| JP | 2000181377 A | 6/2000 |
| JP | 2011043741 A | 3/2011 |
| JP | 2011170008 A | 9/2011 |
| JP | 2011203460 A | 10/2011 |

* cited by examiner

*Primary Examiner* — William C. Dowling
(74) *Attorney, Agent, or Firm* — Rossi, Kimms & McDowell LLP (57) ABSTRACT

An image projection apparatus includes a light modulation element, a pixel shift unit that includes an optical element configured to shift an optical path of light from a pixel in the light modulation element and to shift a position on a projection surface of projected pixel formed on the projection surface by a projection optical system with the light, and an attachment portion to which the pixel shift unit is attached. The optical element shifts the optical path by a shift amount in accordance with an attachment angle of the pixel shift unit relative to a plane orthogonal to an optical axis from the light modulation element to the projection optical system. The attachment portion is configured to select a plurality of angles for the attachment angle.

7 Claims, 9 Drawing Sheets

| RESOLUTION | NUMBER OF PIXELS | | PIXEL PITCH [um] | NECESSARY OPTICAL PATH SHIFT AMOUNT [um] | $\theta$ [deg] |
|---|---|---|---|---|---|
| | HORIZONTAL DIRECTION | VERTICAL DIRECTION | | | |
| XGA | 1024 | 768 | 17.4 | 12.3 | 42 |
| WXGA | 1280 | 768 | 13.9 | 9.8 | 32 |
| WUXGA | 1920 | 1200 | 9.3 | 6.6 | 0 |

IMAGE PROJECTION APPARATUS

BACKGROUND OF THE INVENTION

Field of the Invention

The present invention relates generally to an image projection apparatus (referred to as a "projector" hereinafter) that projects light modulated by a light modulation element, such as a liquid crystal panel and displays an image, and more particularly to a projector having a pixel shift unit.

Description of the Related Art

Some projectors have a pixel shift unit that shifts a pixel in a projected image by shifting an optical path of image light projected onto a projection surface via a projection optical system from a light modulation element so that the projected image is displayed with a resolution higher than that of the light modulation element. A projector disclosed in Japanese Patent Laid-Open No. ("JP") 2011-203460 uses a plane plate glass for the pixel shift unit, and shifts the pixel in the projected image by swinging (inclining) the plane plate glass relative to an optical axis that extends from the light modulation element to the projection optical system.

JP 2011-170008 discloses a projector that controls a shift direction and a shift amount of the pixel in the projected image by controlling angles of two, i.e., vertical and horizontal, plane plate glasses for pixel shift units in accordance with the aspect ratio of the projected image.

The projector uses light modulation elements having a variety of resolutions, and common use of an optical system that includes a pixel shift unit is suitable for cost reductions even for the light modulation elements to be used with different resolutions.

However, the common use of the optical system for a plurality of light modulation elements having different resolutions requires the light modulation elements to have an equal size and the pixel pitch is consequently different in accordance with the resolution of the light modulation element. The plane plate glass needs to have a different slope for the light modulation elements having different pixel pitches.

SUMMARY OF THE INVENTION

The present invention provides a projector that can use a common pixel shift unit even when light modulation elements have different pixel pitches etc.

An image projection apparatus according to one aspect of the present invention includes a light modulation element, a pixel shift unit that includes an optical element configured to shift an optical path of light from a pixel in the light modulation element and to shift a position on a projection surface of projected pixel formed on the projection surface by a projection optical system with the light, and an attachment portion to which the pixel shift unit is attached. The optical element shifts the optical path by a shift amount in accordance with an attachment angle of the pixel shift unit relative to a plane orthogonal to an optical axis from the light modulation element to the projection optical system. The attachment portion is configured to select a plurality of angles for the attachment angle.

Further features of the present invention will become apparent from the following description of exemplary embodiments with reference to the attached drawings.

DESCRIPTION OF THE EMBODIMENTS

Referring now to the accompanying drawings, a description will be given of embodiments of the present invention.

First Embodiment

Figure 1A:
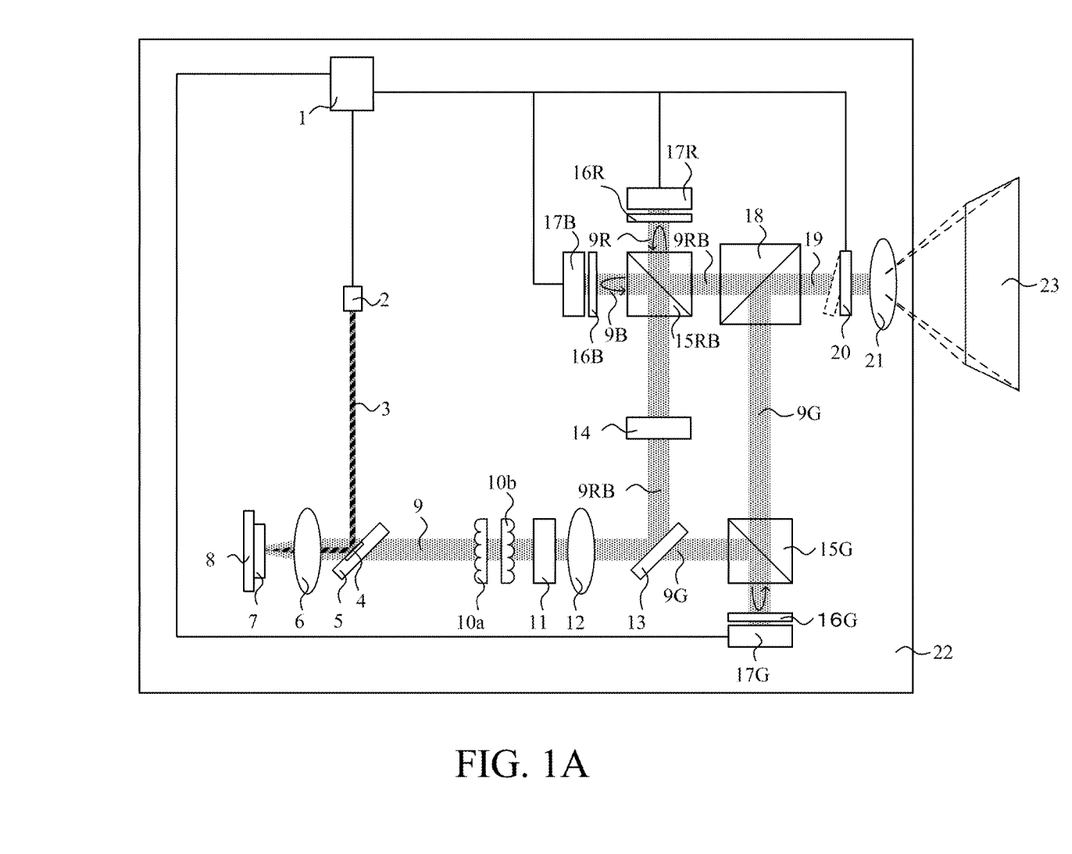
FIGS. 1A and 1B illustrate a structure of a projector according to a first embodiment of the present invention.

FIG. 1A illustrates a structure of a projector as an image projection apparatus according to a first embodiment of the present invention. In the following description, R, G, and B means red, green, and blue. The projector according to this embodiment includes a light source part, an optical system, and a controller 1.

In the light source, an excitation light source 2 is a semiconductor laser (LD) that emits blue light with a peak wavelength of 455 nm. The excitation light source 2 may use an LED. The controller 1 controls driving of the excitation light source 2. The controller 1 includes a computer, such as a CPU, and controls the entire projector in accordance with a computer program. The projector includes a housing 22. The housing 22 is used to house and hold the light source unit and the optical system. The light source unit, the optical system, and the controller 1 housed in the housing 22 is housed and held by an unillustrated armor case (armor member).

Excited light 3 emitted from the excitation light source 2 is reflected by a light reflecting member 4, condensed by a first lens 6, and irradiated onto a fluorescent body 7. The light reflecting member (reflector) 4 is provided only to part on the surface of the glass plate 5 illuminated by the excitation light 3. The first lens 6 condenses the excitation light 3, and forms a light irradiation area having a predetermined size on the fluorescent body 7.

The fluorescent light 7 is supported by a fluorescent-body supporting member (substrate) 8. The fluorescent body 7 emits yellow light as fluorescent light through a wavelength conversion (fluorescent conversion) of part in the excitation light 3. The blue light unconverted by the fluorescent conversion in the excitation light 3 is diffused and reflected by the fluorescent body 7, and returns to the first lens 6. This configuration generates illumination light 9 as white light in which the yellow light and the blue light are mixed. The fluorescent-body supporting member 8 that supports the fluorescent body 7 is rotated by an unillustrated motor so as to avoid the fluorescent conversion efficiency from lowering due to the temperature rise of local area of the fluorescent body 7 illuminated by the excitation light 3.

Figure 1B:
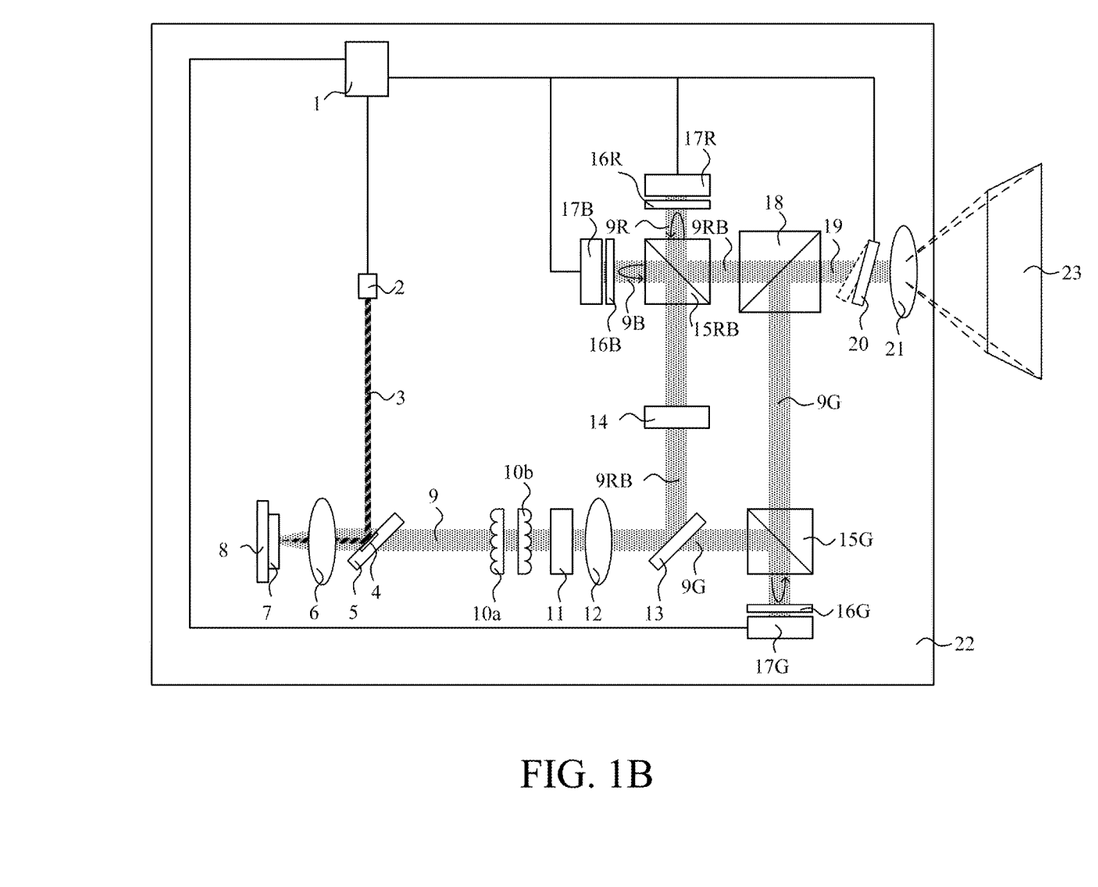

The illumination light 9 is collimated by the first lens 6, transmits a region other than the light reflecting member 4 on the glass plate 5, and goes to a first fly-eye lens 10a. The first fly-eye lens 10a and a second fly-eye lens 10b divide the illumination light 9 into a plurality of light fluxes, and condense them. The plurality of condensed light fluxes enter a polarization conversion element 11. The polarization conversion element 11 converts the illumination light 9 as non-polarized light into linearly polarized light having a predetermined polarization direction (which is herein S-polarized light having a polarization direction orthogonal to the paper plane of FIGS. 1A and 1B).

The plurality of light fluxes as the illumination light 9 emitted from the polarization conversion element 11 are condensed by the second lens 12 and superimposed on each light modulation element (17R, 17G, 17R). Thereby, each light modulation element is uniformly illuminated.

The illumination light 9 that has transmitted the second lens 12 is led to a dichroic mirror 13. The dichroic mirror 13 reflects R+B light 9RB in the illumination light 9, and transmits G light 9G.

The G light 9G as the S-polarized light that has transmitted the dichroic mirror 13 is reflected on a polarization separating (splitting) plane in a G-polarization beam splitter 15G, converted into circularly polarized light by a quarter waveplate 16G, and led to a G-light modulation element 17G. The G-light modulation element 17G is a reflection type liquid crystal panel, similar to the following R-light modulation element 17R and B-light modulation element 17B. The controller 1 controls each light modulation element. The G-light modulation element 17G modulates and reflects the G-light 9G. The P-polarized light in the modulated G light which is converted into linearly polarized light by the quarter waveplate 16G transmits the polarization separating plane in the G-polarization beam splitter 15G and goes to the color combining prism 18. The S-polarized light emitted from the quarter waveplate 16G in the G light is reflected on the polarization separating plane in the G-polarization beam splitter 15G, and returned to the light source side.

On the other hand, a wavelength selective retardation (phase) plate 14 rotates by 90° the polarization direction of the R light in the R+B light 9RB reflected by the dichroic mirror 13 so as to convert the R light into the P-polarized light, and the remaining B light as the S-polarized light transmits the wavelength selective retardation plate 14 without any conversions. The R light 9R as the P-polarized light in the RB light 9RB that has transmitted the wavelength selective retardation plate 14 transmits a polarization separating plate in an RB-polarization beam splitter 15RB, and the B light 9B as the S-polarized light is reflected on the polarization separating plane.

The R light 9R is converted into circularly polarized light by a quarter waveplate 16R, and led to the R-light modulation element 17R. The S-polarized component in the R light that is modulated and reflected by the R-light modulation element 17R and converted into linearly polarized light by the quarter waveplate 16R and emitted, is reflected on the polarization separating plane in the RB-polarization beam splitter 15RB and goes to the color combining prism 18. The P-polarized light emitted from the quarter waveplate 16R in the R light transmits the polarization separating plane in the RB-polarization beam splitter 15RB and returns to the light source side.

The B light 9B reflected on the polarization separating plane in the RB-polarization beam splitter 15RB is converted into circularly polarized light by the quarter waveplate 16B and led to the B-light modulation element 17B. The P-polarized light in the B light, which is modulated and reflected by the B-light modulation element 17B and converted into linearly polarized light and emitted by the quarter waveplate 16B, transmits the polarization separating plane in the RB-polarization beam splitter 15RB and goes to the color combining prism 18. The S-polarized light emitted from the quarter waveplate 16B in the B light is reflected by the polarization separating plane in the RB-polarization beam splitter 15RB and returned to the light source side.

The color combining prism 18 reflects the G light and transmits the R light and B light, combines the G light, the R light, and the B light with one another, and generates projected light 19. The projected light 19 transmits a pixel shift unit (pixel shift device, pixel shift mechanism) 20, and is reflected onto a projection surface 23, such as a screen, via a projection lens (projection optical system) 21. Thereby, a projected image as a full color image is displayed on the projection surface 23.

The pixel shift unit 20 shifts the optical path of the light from each pixel in each light modulation element, and shifts an image of a pixel (referred to as a "projected pixel" hereinafter) formed by the light as part of the projected image on the projection surface 23.

Figure 2A:
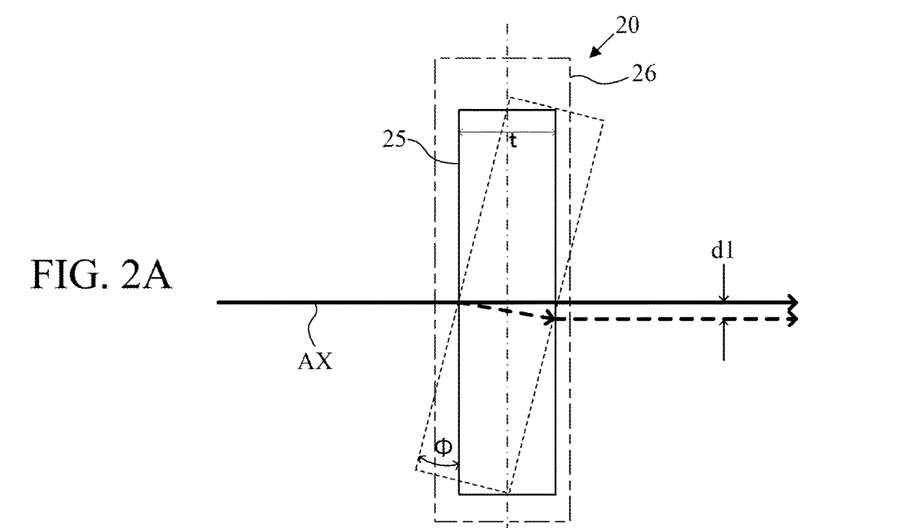
FIGS. 2A and 2B illustrate a pixel shift unit according to the first embodiment.
Figure 2B:
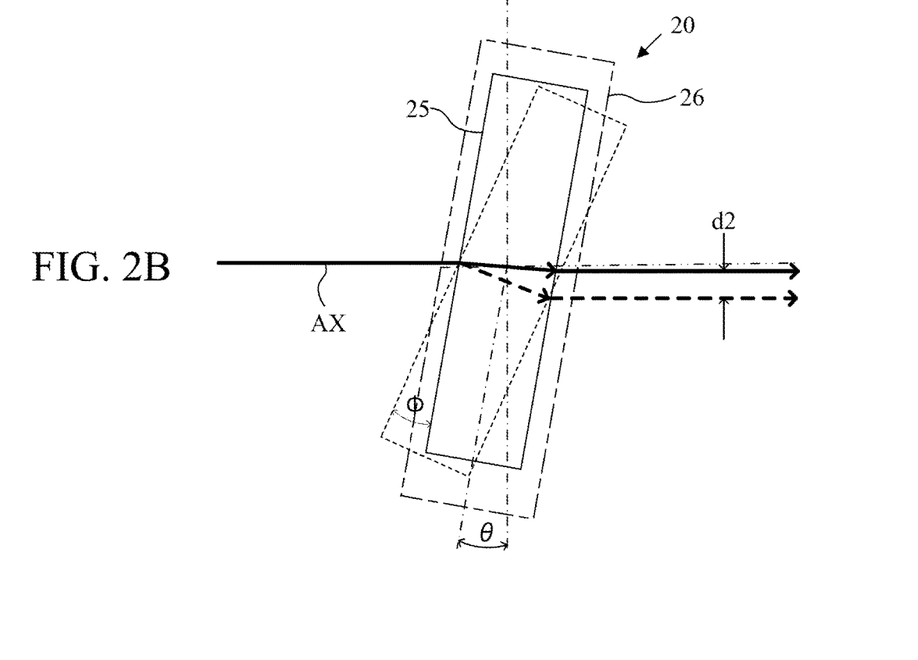

FIGS. 2A and 2B illustrate the pixel shift unit 20. The pixel shift unit 20 includes a plane plate 25 as an optical element that transmits the projected light 19. The optical path of the projected light 19 can be shifted by utilizing the refraction in the plane plate 25 and by changing an orientation (slope) of the plane plate 25 to an optical axis AX from the light modulation element 17 (R, G, B) to the projection lens 21. The plane plate 25 can swing around an axis vertical to the illustrated paper plane between a first orientation illustrated by a solid line and a second orientation illustrated by a broken line in FIGS. 2A and 2B. FIGS. 2A and 2B illustrate two examples with different first and second orientations of the plane plate 25. As illustrated in FIG. 2A, the plane plate 25 is swingably held by a holding frame (holding member or holder) 26. The holding frame 26 extends long in a direction orthogonal to the optical axis AX when viewed from the side as illustrated in FIG. 2A, and has a rectangular frame shape when viewed from the optical axis direction.

The plane plate 25 is made of a light transmitting material, such as glass and resin. The plane plate 25 has a rectangular transmission surface (entrance and exit surfaces).

In this embodiment, the position of the projected pixel when the plane plate 25 has the first orientation and the position of the projected pixel when the plane plate 25 has the second orientation shift by half as large as the projected pixel pitch on the projection surface 23 in the oblique (diagonal) direction. The number of pixels (resolution) of the apparent projected image increases by alternately forming (displaying) the projected image at two positions. A shift amount between the positions of the two projected pixels may be quarter or three-quarters as large as the projected pixel pitch. The position of the projected pixel may be shifted in the horizontal direction or vertical direction as well as the oblique direction.

An unillustrated driver held by the holding frame 26 swings the plane plate 25. The controller 1 controls the swing timing at which the driver drives the plane plate 25.

In FIG. 2A, the first orientation of the plane parallel 25 has the transmission surface orthogonal to the optical axis AX. The optical path of the projected light is shifted by an optical path shift amount d1 as expressed below by inclining the plane plate 25 by an angle $\Phi$ from the first orientation to the second orientation, where t is a thickness of the plane plate 25, and n is a refractive index of the plane plate 25.

$$d1 = t \cdot \sin\Phi \cdot \left(1 - \frac{\cos\Phi}{n \cdot \cos\Phi'}\right)$$

Φ' is given as follows.

$$\Phi' = \sin^{-1}\left(\frac{\sin\Phi}{n}\right)$$

In FIG. 2B, the first orientation of the plane plate 25 has the transmission surface that inclines by an initial inclination (tilt) angle θ from the position orthogonal to the optical axis AX. The optical path of the projected light 19 shifts by an optical path shift amount d2 as expressed below by inclining the plane plate 25 from the first orientation by Φ into the second orientation (angle Φ+θ).

$$d2 = t \cdot \left[\sin(\Phi + \theta) \cdot \left\{1 - \frac{\cos(\Phi + \theta)}{n \cdot \cos\Phi''}\right\} - \sin\theta \cdot \left\{1 - \frac{\cos\theta}{n \cdot \cos\theta'}\right\}\right]$$

Herein, Φ" and θ' are given as follows.

$$\Phi'' = \sin^{-1}\left\{\frac{\sin(\Phi + \theta)}{n}\right\}$$

$$\theta' = \sin^{-1}\left(\frac{\sin\theta}{n}\right)$$

Figure 3A:
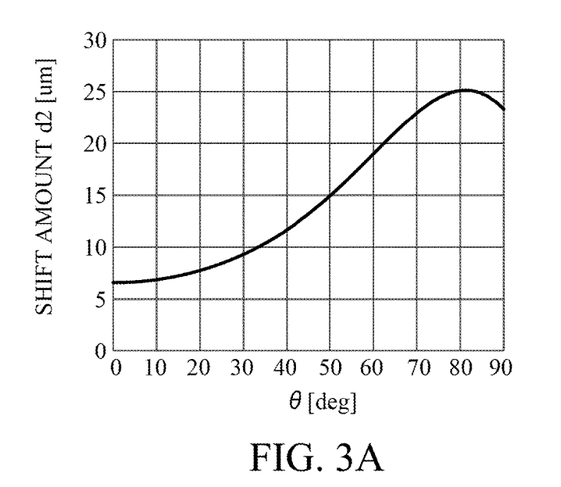
FIGS. 3A and 3B illustrate effects of the first embodiment.

FIG. 3A illustrates a relationship between the initial inclination angle θ and the optical path shift amount d2 [µm] where the plane plate 25 has a thickness t of 1.32 [mm], a refractive index n of 1.4, and a swing angle Φ is 1 [deg]. As illustrated, the optical path shift amount d2 can be changed by changing the initial inclination angle θ.

Figure 3B:
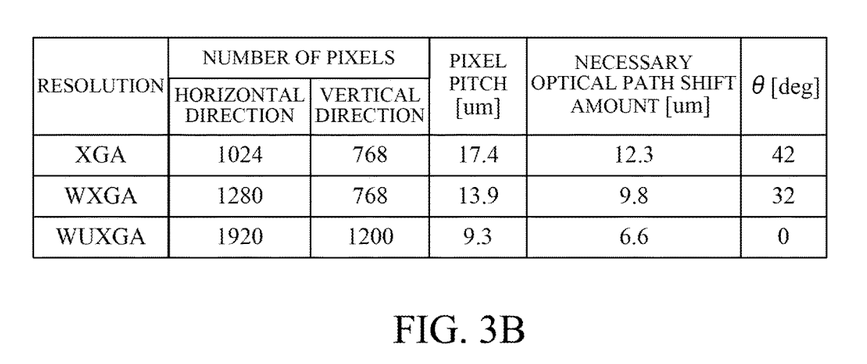

FIG. 3B illustrates the optical path shift amount necessary for each resolution of the light modulation element, and the initial inclination angle θ for realizing the shift amount. Herein, the diagonal size of the light modulation surface of the light modulation element is set to a constant value of 0.7 [inch] irrespective of the resolution. As illustrated by FIG. 3B, the common plane plate 25 or the pixel shift unit 20 can be used by changing the initial inclination angle θ for the light modulation element having the different resolution. The thickness, the refractive index, and the swing angle of the plane plate 25 illustrated in FIGS. 3A and 3B are merely illustrative, and may have other values.

Figure 4:
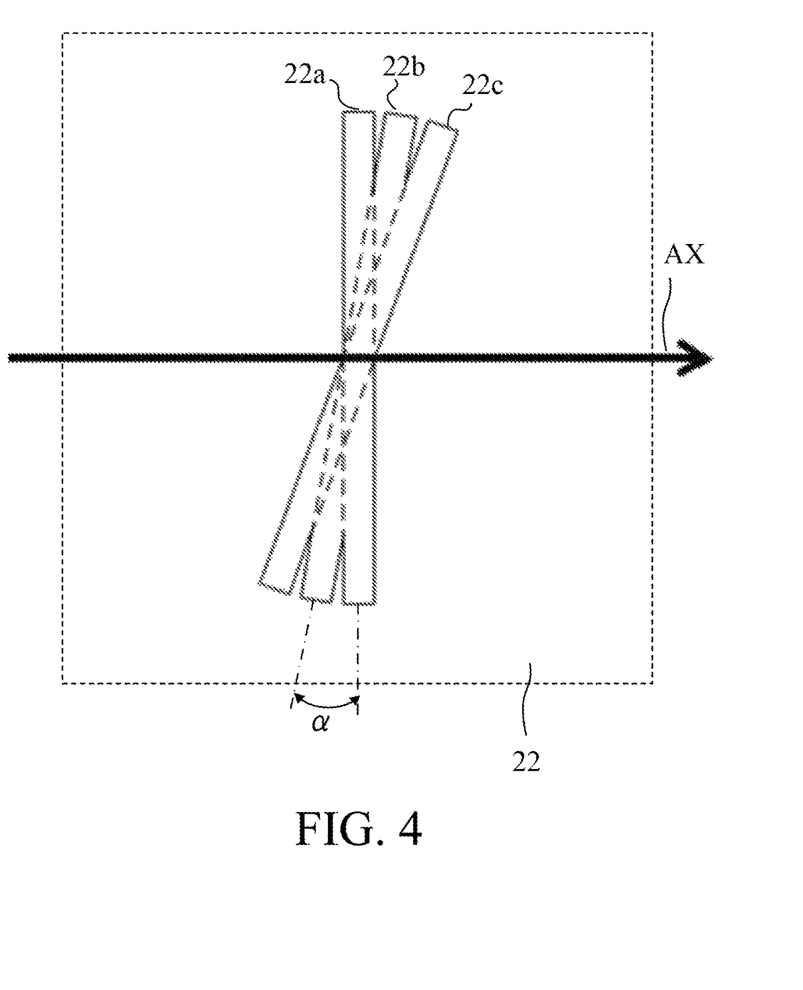
FIG. 4 illustrates a structure of an attachment portion for the pixel shift unit according to this embodiment.

Referring now to FIG. 4, a description will be given of a structure of attaching the common pixel shift unit 20 to the plurality of projectors having different resolutions of the light modulation elements by changing the initial inclination angle θ of the plane plate 25.

The housing 22 for the projector has a plurality of attachment groove portions (holders) 22a, 22b, and 22c as attachment portions into which the holding frame 26 of the pixel shift unit 20 is selectively inserted so as to hold the holding frame 26 and to attach the pixel shift unit 20. The attachment groove portions 22a, 22b, and 22c have different inclination angles α to the plane orthogonal to the optical axis AX. In the three examples illustrated in FIG. 3B, for example, the inclination angles α of the attachment groove portions 22a, 22b, and 22c to the plane orthogonal to the optical axis AX may be set to 0°, 32°, and 42° which are the same as the initial inclination angles α. The three light modulation elements illustrated in FIG. 3B have a common size and the holding frame 26 has a common size irrespective of the resolution. Hence, the attachment groove portions 22a, 22b, and 22c may have an equal size.

One of the plurality of attachment groove portions 22a, 22b, and 22c previously provided to the projector, which corresponds to the pixel pitch (resolution) in the light modulation element to be used is selected and used to attach the pixel shift unit 20. As a result, the attachment angles of the pixel shift unit 20 to the plane orthogonal to the optical axis AX are 0°, 32°, and 42° corresponding to the inclination angles α of the attachment groove portions 22a, 22b, and 22c. This configuration can provide the optical path shift amount corresponding to the resolution of the light modulation element to be used even with the common pixel shift unit 20.

Second Embodiment

Figure 5A:
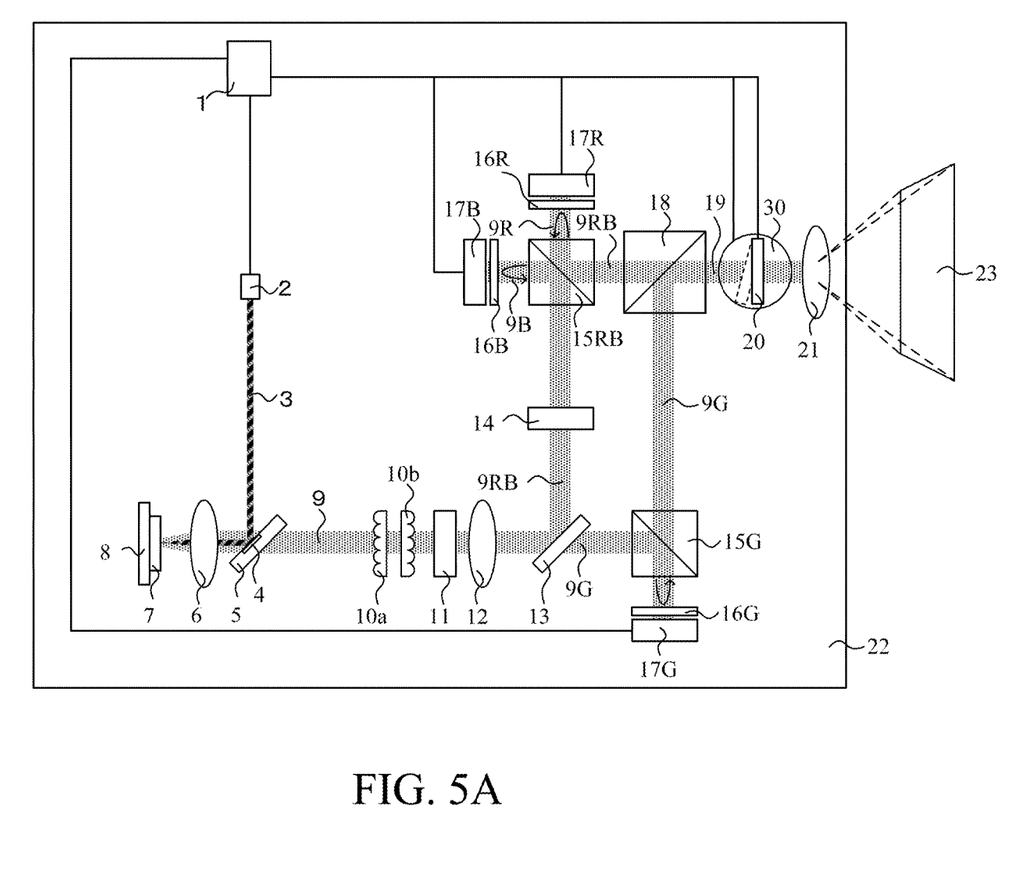
FIGS. 5A and 5B a structure of a projector according to a second embodiment of the present invention.
Figure 5B:
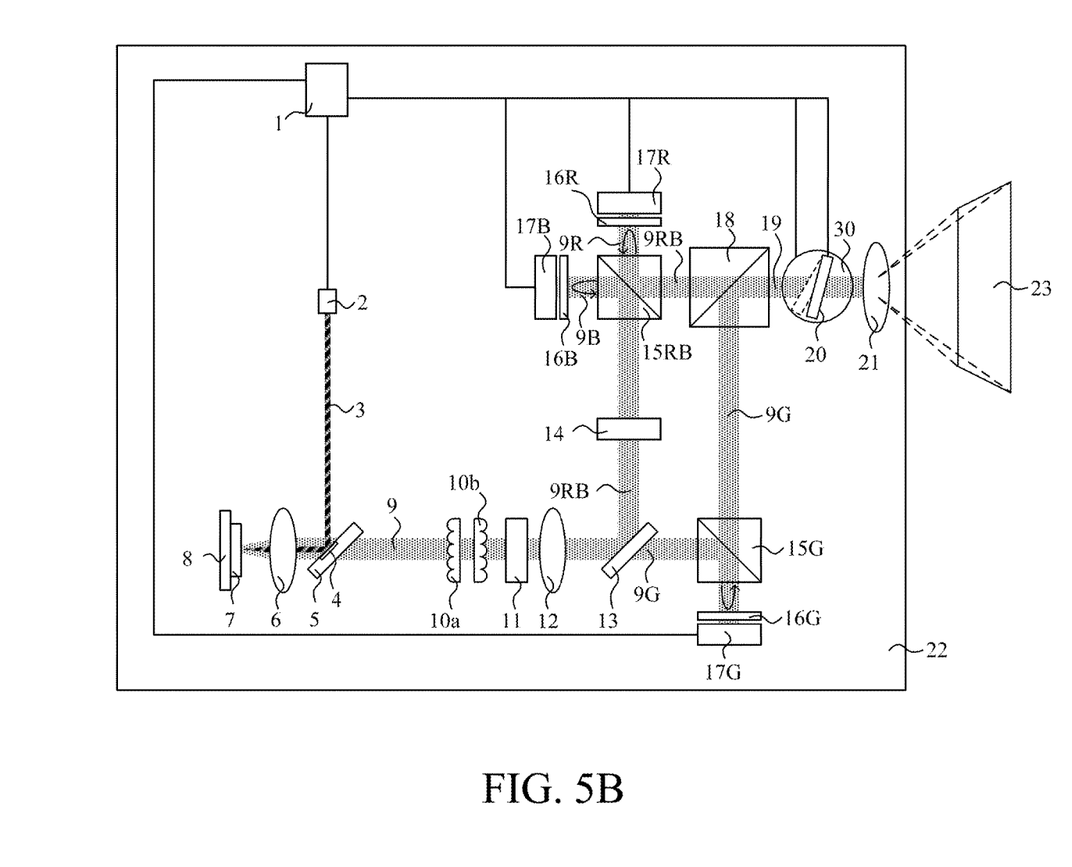

Referring to FIGS. 5A and 5B, a description will be given of a structure of a projector according to a second embodiment of the present invention. The basic structure of the projector according to this embodiment is the same as the projector according to the first embodiment illustrated in FIGS. 1A and 1B, and corresponding elements will be designated by the same reference numerals and a description thereof will be omitted.

This embodiment provides a rotary stage (rotating member) 30 that can rotate as the attachment portion to the housing 22 instead of the plurality of attachment groove portions 22a to 22c described in the first embodiment, and fixes the holding frame 26 of the pixel shift unit 20 onto the rotary stage 30. The rotary stage 30 is rotated by an unillustrated motor controlled by the controller 1.

The attachment angle of the pixel shift unit 20 or the initial inclination angle θ of the plane plate 25 relative to the plane orthogonal to the optical axis AX can be freely set by selecting the rotating position of the rotary stage 30. For example, in the three examples illustrated in FIG. 3B, the rotating position of the rotary stage 30 may be selected so that the plane plate 25 has the initial inclination angle θ (attachment angles of the pixel shift unit 20) of 0°, 32°, and 42°. FIGS. 5A and 5B illustrate that the rotating position of the rotary stage 30 is selected so that the plane plate 25 has the initial inclination angle θ of 0° and 32°.

The rotating position (attachment angle) corresponding to the pixel pitch in the light modulation element to be used is selected and the pixel shift unit 20 is fixed by utilizing the rotating position of the rotary stage 30 provided in this projector. This configuration can obtain the optical path shift amount even with the common pixel shift unit 20, which corresponds to the resolution in the light modulation element to be used.

The rotating position of the rotary stage 30 may be set in the factory shipping and exchange of the light modulation element in the projector, etc. The rotating position of the rotary stage 30 may be controlled by the controller 1 based on the value set by the factory operator. Alternatively, the controller 1 previously acquires the information relating to the resolution or pixel pitch in the light modulation element and controls the rotating position of the rotary stage 30 based on the value. It is unnecessary that the controller 1 always controls the rotating position of the rotary stage 30, and the factory operator may manually adjusts the rotating position of the rotary stage 30.

Third Embodiment

Figure 6A:
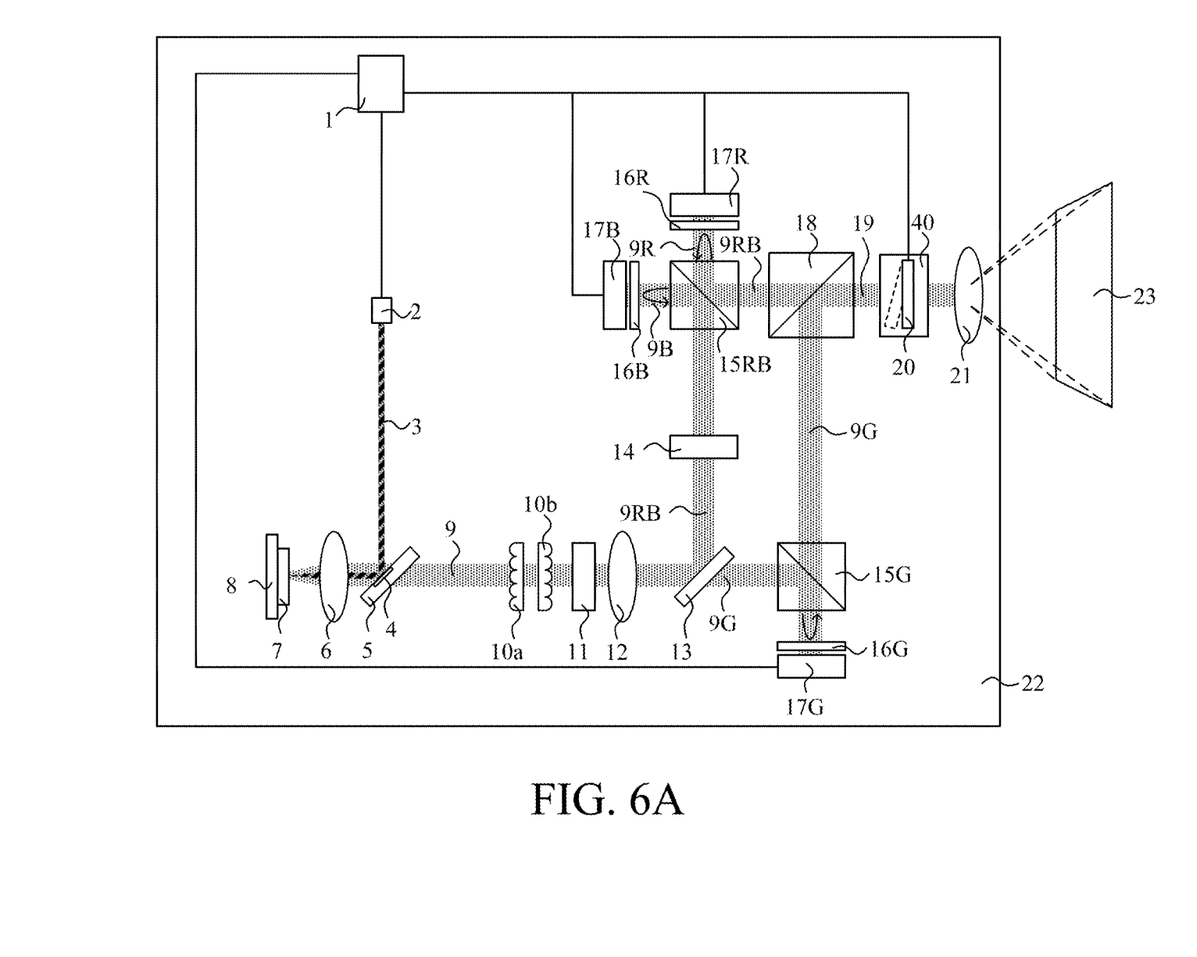
FIGS. 6A and 6B a structure of a projector according to a third embodiment of the present invention.
Figure 6B:
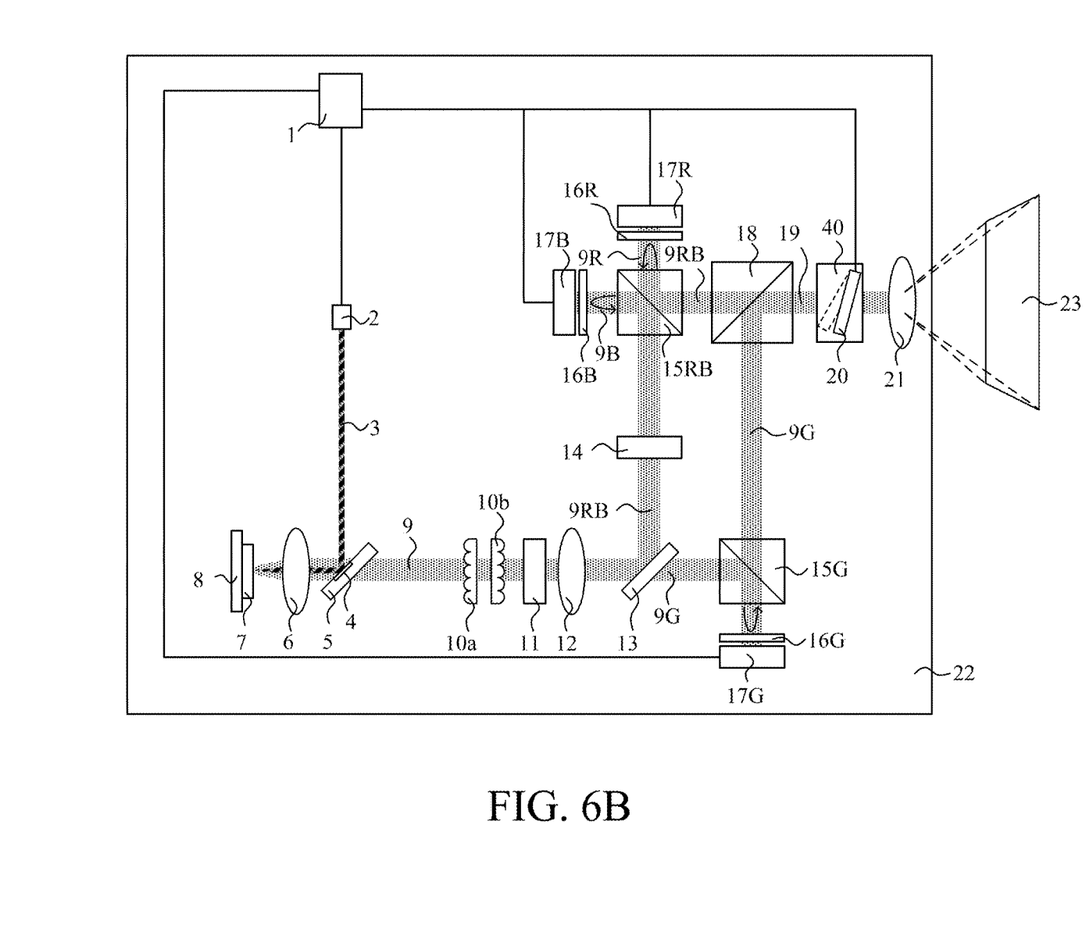

Referring to FIGS. 6A and 6B, a description will be given of a structure of the projector according to a third embodiment of the present invention. The basic structure of the projector according to this embodiment is the same as the projector according to the first embodiment illustrated in FIGS. 1A and 1B, and corresponding elements will be designated by the same reference numerals and a description thereof will be omitted.

This embodiment provides an attachment portion 40 that rotatably holds the holding frame 26 of the pixel shift unit 20 on the housing 22. When the rotating angle of the pixel shift unit 20 (holding frame 26) to the attachment portion 40 is selected and fixed, the attachment angel of the pixel shift unit 20 or the initial inclination angle θ of the plane plate 25 can be freely set. For example, in the three examples illustrated in FIG. 3B, the rotating position (attachment angle) of the holding frame 26 in the pixel shift unit 20 to the attachment portion 40 may be selected so that the initial inclination angle θ of the plane plate 25 can be 0°, 32°, and 42°. FIGS. 6A and 6B illustrate that the rotating position of pixel shift unit 20 relative to the attachment portion 40 is selected so that the initial inclination angle θ of the plane plate 25 can be 0° and 32°.

Thus, the attachment angle of the pixel shift unit 20 relative to the attachment portion 40 provided in the projector is selected so as to correspond to the resolution (pixel pitch) of the light modulation element to be used, and then the pixel shift unit 20 is fixed. Thereby, the optical path shift amount corresponding to the resolution of the light modulation to be used can be obtained with the common pixel shift unit 20.

Each embodiment uses the plane plate for the optical element, but may use another optical element, such as a mirror, as long as it can shift the optical path. Each embodiment uses the reflection type liquid crystal panel for the light modulation element, but may use another light modulation element, such as a transmission type liquid crystal panel and a digital micro mirror device. Moreover, each embodiment uses the fluorescent body for the light source part, but may use a discharge lamp, RGB lasers or LEDs, etc.

Each embodiment provides an image projection apparatus that can attach a pixel shift unit by selecting an angle according to the pixel pitch etc. in a light modulation element in the plurality of attachment angles.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-154518, filed on Aug. 9, 2017 which is hereby incorporated by reference herein in its entirety.

What is claimed is:

1. An image projection apparatus comprising:
a light modulation element;
a pixel shift unit that includes an optical element configured to shift an optical path of light from a pixel in the light modulation element and to shift a position on a projection surface of projected pixel formed on the projection surface by a projection optical system with the light; and
an attachment portion to which the pixel shift unit is attached,
wherein the optical element shifts the optical path by a shift amount in accordance with an attachment angle of the pixel shift unit relative to a plane orthogonal to an optical axis from the light modulation element to the projection optical system,
wherein the attachment portion is configured to select a plurality of angles for the attachment angle, and
wherein the attachment portion includes a plurality of holders configured to selectively hold the pixel shift unit.

2. The image projection apparatus according to claim 1, wherein:
the pixel shift unit further includes a holding member configured to swingably hold the optical element to change an inclination angle of the optical element relative to the plane orthogonal to the optical axis, and
the holding member is attached to the attachment portion.

3. The image projection apparatus according to claim 1, wherein the plurality of angles correspond to different pixel pitches in a plurality of light modulation elements.

4. The image projection apparatus according to claim 3, wherein the plurality of light modulation elements have an equal size of a light modulation surface.

5. An image projection apparatus according to claim 1, comprising:
a light modulation element;
a pixel shift unit that includes an optical element configured to shift an optical path of light from a pixel in the light modulation element and to shift a position on a projection surface of projected pixel formed on the projection surface by a projection optical system with the light; and
an attachment portion to which the pixel shift unit is attached,
wherein the optical element shifts the optical path by a shift amount in accordance with an attachment angle of the pixel shift unit relative to a plane orthogonal to an optical axis from the light modulation element to the projection optical system,
wherein the attachment portion is configured to select a plurality of angles for the attachment angle,
wherein the attachment portion includes a plurality of groove portions, and
wherein an inclination angle of each of the plurality of groove portions is different each other.

6. The image projection apparatus according to claim 5, wherein:
the pixel shift unit further includes a holding member configured to swingably hold the optical element to change an inclination angle of the optical element relative to the plane orthogonal to the optical axis, and
the holding member is attached to the attachment portion.

7. The image projection apparatus according to claim 5, wherein the plurality of angles correspond to different pixel pitches in a plurality of light modulation elements.

* * * * *